United States Patent [19]

Greiwe

[11] Patent Number: 5,062,355
[45] Date of Patent: Nov. 5, 1991

[54] RUN-THROUGH GRILL WITH NON-UNIFORM HEAT DISTRIBUTION ABOUT THE ROLL SURFACE

[75] Inventor: Hansdieter Greiwe, Boxberg, Fed. Rep. of Germany

[73] Assignee: Patzner GmbH & Co., Bad Mergentheim, Fed. Rep. of Germany

[21] Appl. No.: 510,527

[22] Filed: Apr. 18, 1990

Related U.S. Application Data

[63] Continuation of Ser. No. 301,232, Jan. 24, 1989, abandoned.

[30] Foreign Application Priority Data

Jan. 27, 1988 [DE] Fed. Rep. of Germany ....... 3802345

[51] Int. Cl.$^5$ .......................... A47J 37/06; B21B 27/06
[52] U.S. Cl. ......................................... 99/349; 29/130; 29/132; 99/423; 100/93 RP; 165/89; 219/469
[58] Field of Search ................................. 99/349–352, 99/373, 386, 390, 422, 423, 441; 34/108, 132, 133; 126/41 R, 41 B; 219/244, 469–471; 165/89, 90; 100/93 RP; 29/110, 130, 132

[56] References Cited

U.S. PATENT DOCUMENTS

| | | | |
|---|---|---|---|
| 1,628,554 | 5/1927 | Pagano | 219/470 X |
| 1,819,988 | 8/1931 | Jones | 165/89 |
| 2,243,492 | 5/1941 | Wilson | 99/373 X |
| 2,547,086 | 4/1951 | McDermott | 165/89 X |
| 2,739,218 | 3/1956 | Wennerlund | 219/469 |
| 3,020,383 | 2/1962 | Onishi et al. | 100/93 RP |
| 3,401,626 | 9/1968 | Amalfitano | 99/390 X |
| 3,414,711 | 12/1968 | Guyet et al. | 219/470 X |
| 3,423,573 | 1/1969 | Richards et al. | 219/470 X |
| 3,543,002 | 11/1970 | Poole | 219/469 X |
| 3,631,917 | 1/1972 | Lorton | 165/89 X |
| 3,991,665 | 11/1976 | Lang-Ree et al. | 99/441 |
| 4,072,092 | 2/1978 | Köhli et al. | 99/349 X |
| 4,574,771 | 3/1986 | Gutekunst | 99/349 X |
| 4,768,433 | 9/1988 | Boissevain | 100/93 RP |

FOREIGN PATENT DOCUMENTS

| | | | |
|---|---|---|---|
| 0053656 | 5/1981 | European Pat. Off. | |
| 713355 | 9/1966 | Italy | 99/349 |
| 0141435 | 11/1979 | Japan | 219/469 |

Primary Examiner—Harvey C. Hornsby
Assistant Examiner—C. Cooley
Attorney, Agent, or Firm—Burgess, Ryan and Wayne

[57] ABSTRACT

A run-through grill has at least two rolls which are mounted for rotation about horizontal axes. Each of the rolls comprises a jacket, which is heatable through a heating element arranged in the roll. A cavity is provided substantially symmetrically within the jacket, and contains the heating element. A filling of a heat-conductive material which is fluid is provided in the cavity. The filling quantity is chosen so that on the one hand an unfilled portion of the cavity remains, and on the other hand, at least sections of the heating element are continually in heat-transmitting connection with the filling. With this arrangement, the region of the jacket which borders on the unfilled cavity assumes a different temperature during passage of a cooking product to be treated than the region of the jacket in which the filling is present.

7 Claims, 4 Drawing Sheets

RUN-THROUGH GRILL WITH NON-UNIFORM HEAT DISTRIBUTION ABOUT THE ROLL SURFACE

This is a continuation of application Ser. No. 301,232, filed Jan. 24, 1989, abandoned.

BACKGROUND OF THE INVENTION

The present invention relates to a run-through grill.

A run-through grill is known from European Published Patent Application No. 0053656 and will be described with reference to the annexed FIGS. 1 and 2. In the known run-through grill, there are rotatably mounted in a housing 2, two (FIG. 2) or three rolls 10, 10', 10" (FIG. 1), the axes of rotation of the rolls being horizontal. The arrangement of the rolls relative to each other is such that a gap 5 remains between them. In the housing 2, above the gap 5, a feed slot 3 is provided, so that a food to be roasted, e.g. a steak 1, can be introduced into gap 5. Rolls 10 and 10', 10" defining the gap rotate in opposite directions, as is indicated by the arrows in FIGS. 1 and 2, so that the roast 1 travels through gap 5 to a dispensing slot 4.

Each of the rolls 10 comprises a jacket 11 and a heating element 12 lying therein. Between heating element 12 and jacket 11, a cavity 13 may be formed.

If it is desired to grill a steak, the meat should, for optimum results, first be browned briefly at a relatively high temperature (about 300° to 320° C.) and then cooked further at a relatively low temperature (200° to 220° C.). This first roasting at the high temperature results in quick browning and ensures that the pores in the meat are closed. In the known arrangement, jacket 11 is heated by heating element 12 to the browning temperature of 320° C. Accordingly, when a steak 1 is introduced, the jacket temperature will, upon contact of jacket 11 with roast 1, fall very quickly, so that this browning effect is not ensured. If jacket 11 is made relatively thick, so that it has a high heat capacity, the high browning temperature will persist a little longer but this will depend in any case on the run-through speed at which the grilling takes place. Furthermore, the jacket temperature decreases to the extent that the cooking process is unsatisfactory. Further, if the thermal power of heating element 12 is increased, the browning temperature will be too high and the roast will burn.

OBJECT AND SUMMARY OF THE INVENTION

It is an object of the present invention to develop a run-through grill in which temperature conduction of the rolls is ensured to achieve a desired temperature characteristic during grilling.

The present invention is directed to a run-through grill including a roll which is designed to have a non-uniform heat distribution in the circumferential direction. The non-uniform heat distribution is necessary to obtain proper cooking of a steak. As previously indicated, when cooking a steak, it is desired to first contact the steak with a portion of the roll at a temperature much higher than the cooking temperature. The contact with the roll at the higher temperature sears the surface of the meat and seals the pores. After the pores are sealed, the steaks are then heated at a lower temperature to cook the meat. In view of the two temperature zones in a circumferential direction of the surface of the roll, it is necessary that the roll be heated at a non-uniform temperature distribution in the circumferential direction.

The non-uniform temperature distribution of the roll surface in the circumferential direction is achieved by partially filling the interior of the roll with a particulate heat transfer material. Partial filling of the interior of the roll with a particulate heat transfer material causes the lower portion of the roll to be heated by contact heat exchange between the heating coil, the particulate heat transfer material and the interior surface of the roll. Another portion of the interior surface of the roll is heated by direct radiation from the heating coil. The combination of the contact heat transfer between the heating coil and the inside surface of the roll and the heating of the inside surface of the roll by other heat transfer methods causes a non-uniform temperature profile of the roll in the circumferential direction.

Specifically, in each roll, a cavity substantially symmetrical to the jacket is provided which contains the heating element together with a filling of a heat-conductive material fluid in the cavity. The quantity of filling is chosen so that on the one hand an unfilled residual cavity remains, and on the other hand, at least sections of the heating element are continually in heat-transmitting connection with the filling.

The essential point of the invention is, therefore, that an uneven heat transmission, viewed over the circumference, takes place in the roll between the heating element and the jacket. In the region not containing any sand filling, the heat is transmitted either by direct contact with the heating element or through an air gap (by radiant heat); in the region containing sand, at least an additional heat transmission through the sand takes place. The division of unfilled and sand-filled cavity remains constant, viewed relative to the surrounding upon rotation of the roll, as the filling is fluid (pourable) and only has a certain surface inclination according to its grain size and the like. The region with which the roast comes into contact for browning at first and which requires a high temperature, corresponds to the region in which there is no fluid material. If, therefore, the jacket is preheated by the heating element to the correct browning temperature, the temperature can drop relatively quickly after the browning. Thereafter, the roast comes into contact with the jacket region which is covered (from the inside) with the fluid material. In this region, direct heat transmission takes place between the material and the jacket. As the fluid material is also heated up by the heating element and also is continuously exchanged during rotation of the rolls, simultaneously heat is continually supplied, so that the cooking temperature can be maintained in the region following the browning zone over greater circumferential regions.

DETAILED DESCRIPTION OF THE PREFERRED EMBODIMENTS

Figure 1:
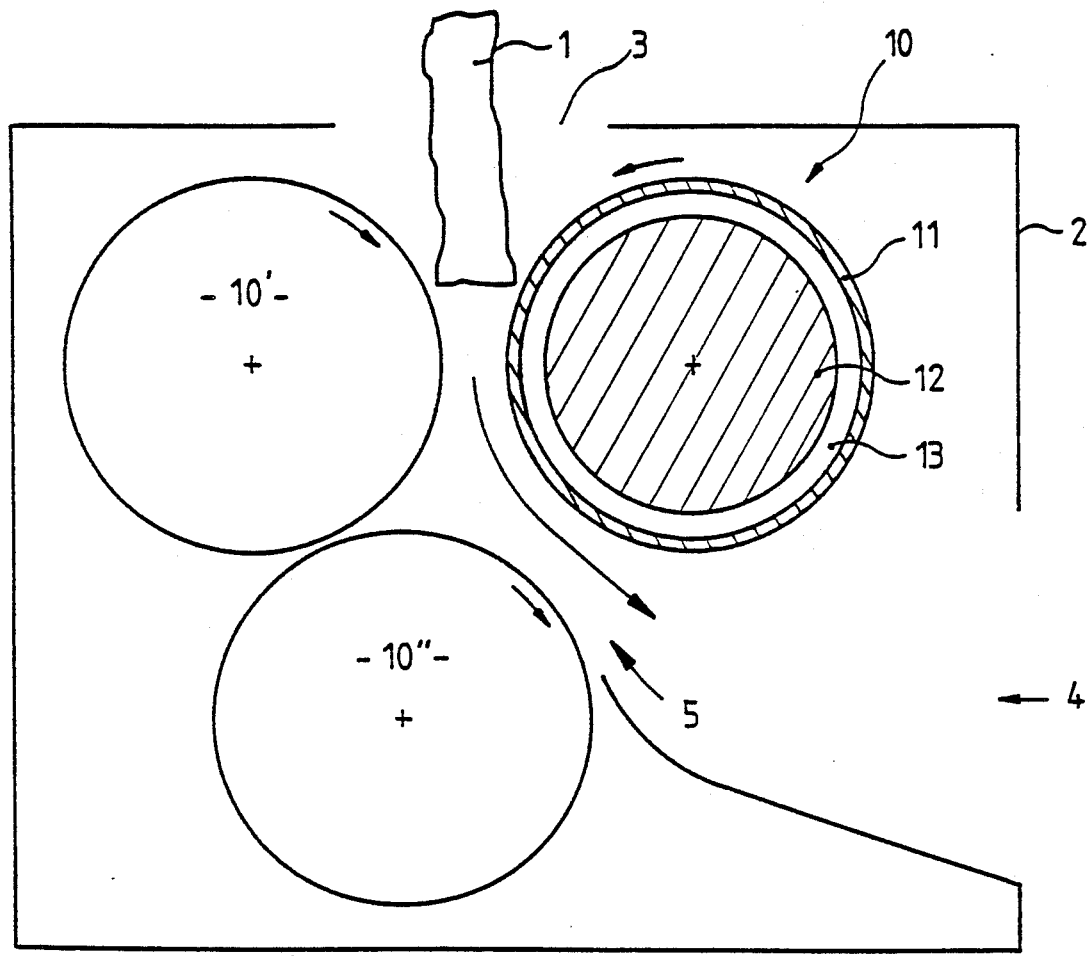
FIG. 1 is a side elevational view, partly in cross-section of a run-through grill according to the prior art.
Figure 2:
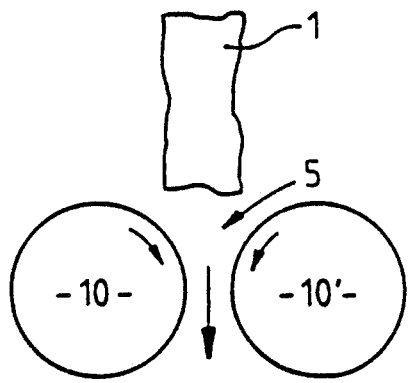
FIG. 2 is a side elevational view, partly in cross-section, of another run-through grill according to the prior art.
Figure 3:
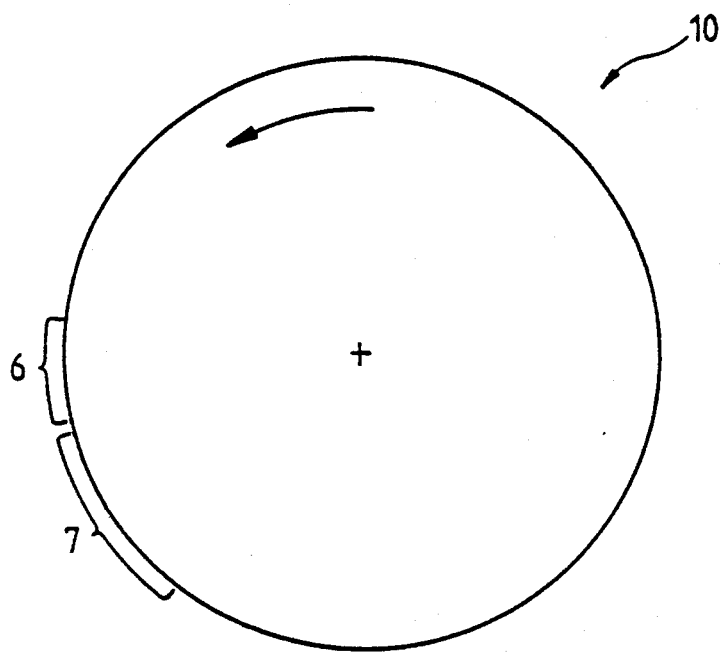
FIG. 3 is a schematic side elevational view of a roll of a run-through grill according to one embodiment of the present invention.

An embodiment of the invention will now be described more specifically with reference to FIGS. 3–6.

Each roll 10 of a run-through grill of the initially mentioned kind comprises a jacket 11, mounted between end faces 17, 17' thereof. End faces 17, 17' have axle stubs 18, 18' respectively by which roll 10 can be mounted in a housing and driven e.g. via gears (not shown). In the cylindrical cavity 13 thus formed, a heating element 12 is disposed which is retained by end sections 15, 15' in corresponding cutout in end faces 17, 17'. Heating element leads 16, 16' are brought out of heating element end sections 15, 15' and connected by slip ring contact (not shown) for current feed in a manner well known. Concerning these points, reference is made expressly to the aforesaid European Patent Publication.

Figure 4:
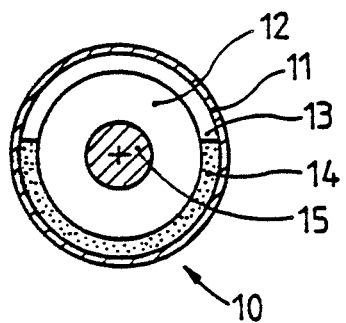
FIG. 4 is a cross-sectional view of the roll of FIG. 3, shown in an inactive state.
Figure 5:
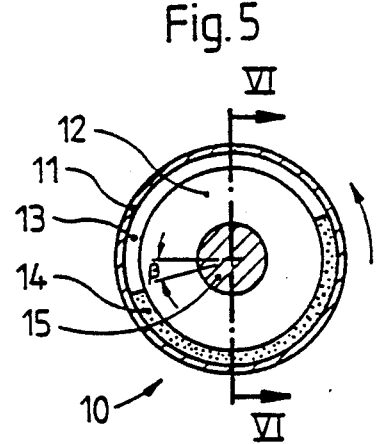
FIG. 5 is a cross-sectional view of the roll of FIG. 3, similar to FIG. 4, and shown in an operative state.
Figure 6:
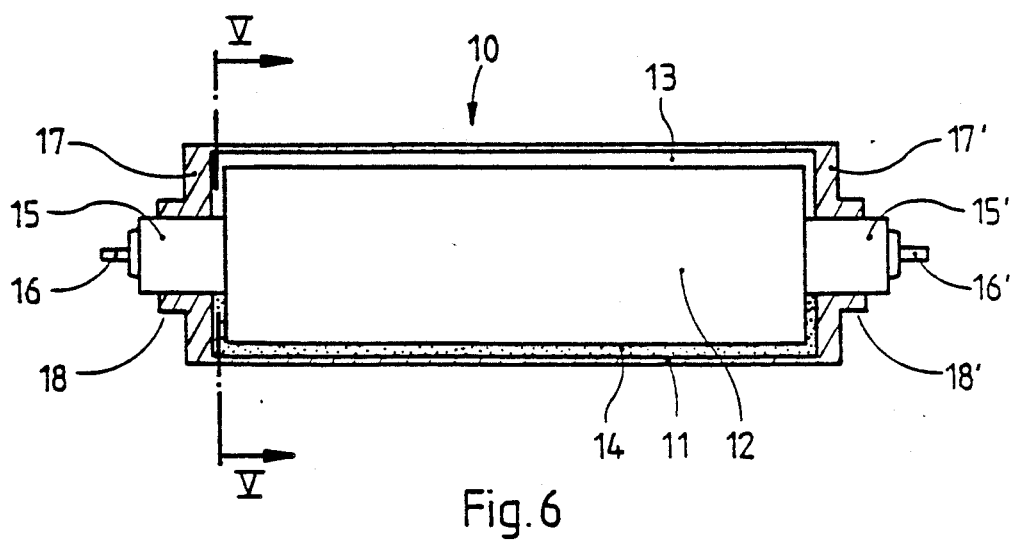
FIG. 6 is a longitudinal cross-sectional view of the roll of FIG. 5, taken along line VI—VI thereof.

A partial volume of cavity 13 is filled with a fluid material such as quartz sand 14 which thus forms a filling 14, and which is indicated by dots in FIGS. 4 to 6. As long as roll 10 stands still (FIG. 4) and the filling 14 is "shaken" into the leveling state, there forms a substantially level horizontal surface of filling material. If the roll rotates in the direction of the arrow shown in FIG. 5, the sand filling 14 is taken along by the angle amount β so that the surface level is slanted. At low roll speeds, this angle β is relatively independent of the speed of rotation and is determined exclusively by the form or respectively the width of cavity 13 and the properties of the fluid material.

In the embodiment of the invention shown here in FIGS. 4 to 6, heating element 12 is formed with a cylindrical peripheral surface, so that cavity 13 constitutes an annular gap. With this arrangement, therefore, upon rotation of the roll, there forms on jacket 11, an upper region in which the heat transfer takes place exclusively by radiation and a second lower region in which the heat transfer takes place through the sand. As the roll moves, since the sand is continually kept in motion due to trickling through the gap, a uniform heat transfer is ensured, the prevailing temperature being determined substantially by the heat capacity or respectively by the thermal resistance of the trickling material or sand. If quartz sand is used, a considerably lower temperature appears than with the use of granulated metal for instance. In this manner, two different temperature zones can be set as required.

Figure 7:
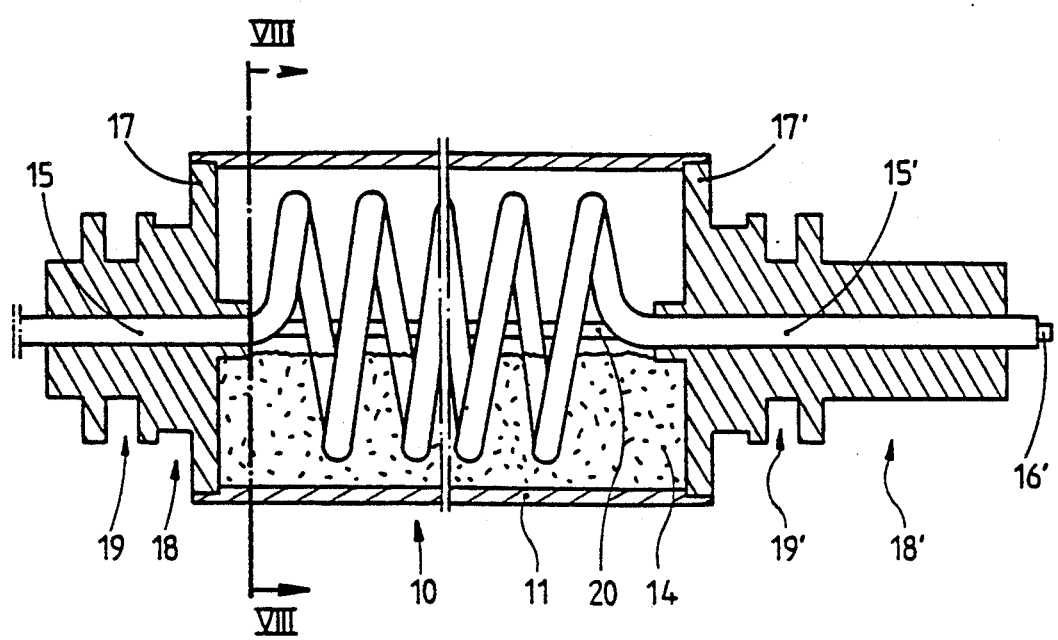
FIG. 7 is a longitudinal cross-sectional view of a roll of a run-through grill according to another embodiment of the present invention.
Figure 8:
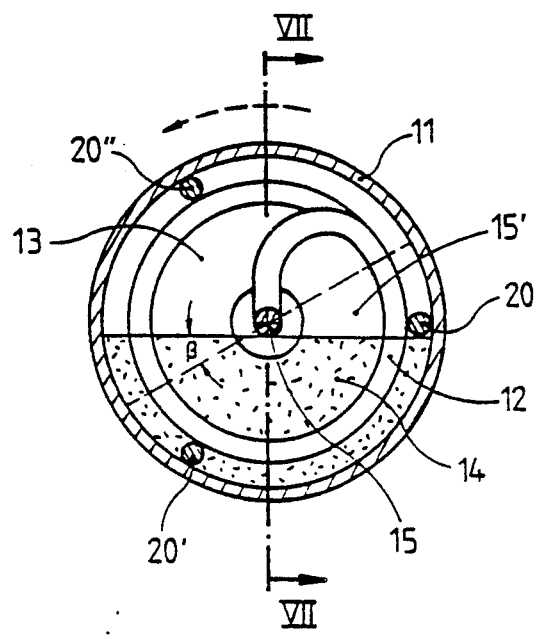
FIG. 8 is a cross-sectional view of the roll of FIG. 7, taken along line VIII—VIII thereof.

In a preferred form of realization as illustrated in FIGS. 7 and 8, a roll is involved for which the initially explained zone of high temperature and the then following zone of lower temperature are to be set. These different temperature zones are marked in FIG. 3 with reference number 6 (browning zone) and 7 (cooking zone). In the embodiment of the invention shown in FIGS. 7 and 8, the end faces 17, 17' of roll 10 have at their axle stubs 18, 18', guide notches 19, 19' for suspension in corresponding guide means in the grill housing (not shown). Otherwise, the design is similar to the form of realization of FIGS. 4 to 6.

In this preferred embodiment of the invention, heating element 12 comprises a helical heating coil which is held tightly by its end sections 15, 15' in the axle stubs 18, 18'. The heating coil is wound so that it extends relatively close to, but without contact with, jacket 11 or respectively to the outer circumference of cavity 13 defined by jacket 11. With such heating elements, because a curvature or sag very readily occurs upon heating, heating coil 12 is held by rod-shaped spacer elements 20, 20', 20'' being strung as "wires" between the end faces 17, 17'. Due to the fact that elements 20–20'' each have a circular cross-section, the contact areas are extremely small so that practically no heat transfer takes place in these regions.

In cavity 13, a quartz sand filling 14 is provided. The filling quantity is such that cavity 13 is approximately half filled. Upon rotation of the roll in arrow direction of FIG. 8, sand filling 14 is taken along, so that its surface is inclined by the angle β.

Above the surface level of sand filling 14, the heat from heating element 12 is transmitted to jacket 11 practically exlusively by radiation. By contrast, the heat in the region of jacket 11 covered by filling 14 is transmitted indirectly through the filling material, which upon rotation of the roll, is thoroughly "stirred up" due to the form of heating element 12. Looking at the small circumferential regions 6 and 7 of roll 10 or of jacket 11 that are decisive for the treatment of object 1 to be grilled, the effect resulting from the design becomes clear. In the given direction of rotation (FIG. 8), the region of jacket 11 which "rises" over the region of filling 14, is heated through the radiant heat given off by heating element 12. The heating power is adjusted here so that jacket 11 will become heated to a temperature of about 320° C. before it gets into the browning zone 6 and comes into contact with the object 1. When the jacket 11 comes into contact with object 1, its temperature decreases from the preset value of about 300°–320° C., the rate of decrease depending primarily on the heat capacity of jacket 11.

As soon as jacket 11 gets into the region which contains filling 14, it substantially assumes the temperature determined by the temperature of the filling. This is due to the fact that filling 14 is continually circulated, and also that region of heating element 12, or respectively of filling 14, is effective for energy transmission in which there is no grilling object 1. This region follows (viewed in the direction of rotation) with cooking region 7 of FIG. 3. Therefore, not only is a temperature distribution better adapted to the roasting process achieved by filling 14, but also a better utilization of the thermal power of heating element 12.

Figure 9:
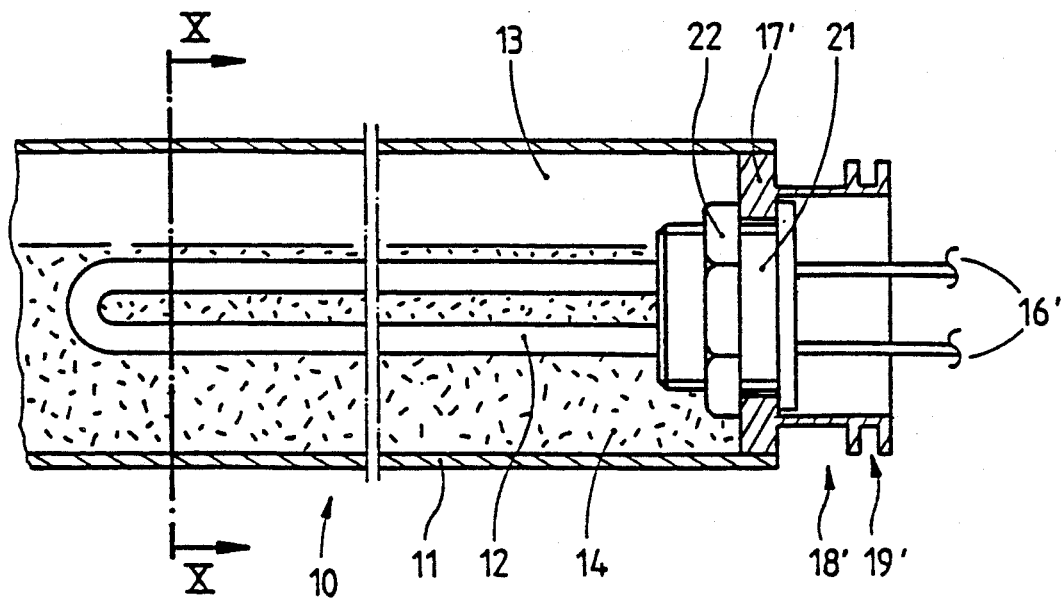
FIG. 9 is a partial longitudinal cross-sectional view of a roll of a run-through grill according to another embodiment of the present invention.
Figure 10:
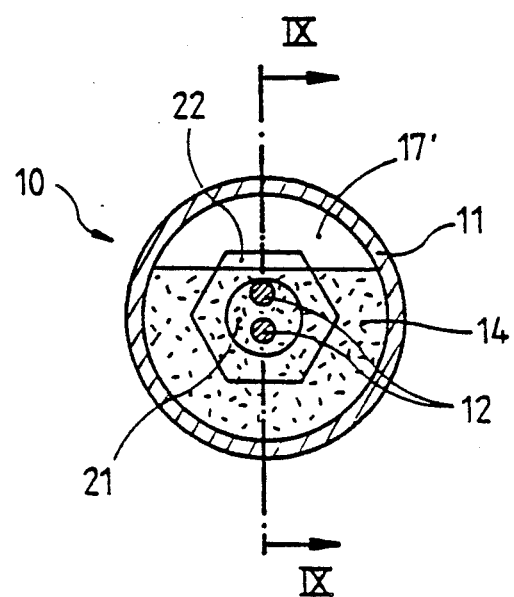
FIG. 10 is a cross-sectional view of the roll of FIG. 9, taken along line IX—IX thereof.

In FIGS. 9 and 10, a further embodiment of the invention is shown. It differs from the embodiment shown before by the different shape of heating element 12 which has a heating body curved in a U-shape and fastened in a pedestal 21 which in turn is fixed by a nut 22 in one of the end faces 17'. If sand filling 14 is provided, as shown in the illustration, covering the heating element, there develops in the region of jacket 11 opposite the cavity (without sand filling), a lower temperature than in the region with filling 14. This embodiment of the invention may be useful in other cases where no browning but rather a slow heating is desired.

Having described specific preferred embodiments of the invention with reference to the drawings, it will be appreciated that the present invention is not limited to those precise embodiments, and that various changes and modifications can be made therein by one of ordinary skill in the art without departing from the spirit or scope of the invention as defined by the appended claims.

What is claimed is:

1. A run-through grill comprising:
    at least two rolls mounted in parallel for rotation about a horizontal axis, and forming a gap therebetween, for downwardly introducing a piece of meat into said gap, each of said at least two rolls comprising:
    (a) a helical heating coil;
    (b) a jacket surrounding said helical heating coil so as to provide a cavity between the heating coil and the jacket;
    (c) a fluidly movable particulate filling material in a quantity so as to continually provide for heat-transferring contact between a lower part of the heating coil and a lower part of the jacket through said particulate filling material and heat-transfer between an upper part of the heating coil and an upper part of the jacket through heat-radiation; and
    (d) a circumferential non-uniform heat distribution over the jacket being provided such that said upper part of said jacket out of contact with said particulate filling material is heated to a higher temperature than said lower part of said jacket in contact with said filling material.

2. The grill according to claim 1, wherein the heating coil is substantially out of direct physical contact with the jacket.

3. The grill according to claim 1, wherein the filling material is quartz sand.

4. The grill according to claim 1, wherein said jacket is cylindrical and said cavity has a substantially annular configuration.

5. The grill according to claim 1, wherein the cavity is substantially cylindrical and said helical heating coil traverses the cylindrical cavity over substantially the entire length thereof.

6. The grill according to claim 5, wherein the heating coil is held by at least three spacer rods parallel to an axis of the jacket, at a defined distance from an inner face of said jacket.

7. The grill according to claim 5, wherein said cavity is substantially half-filled with the particulate filling material.

* * * * *